(No Model.)  3 Sheets—Sheet 1.
J. LANE.
MACHINE FOR MOLDING CAR WHEELS AND OTHER CASTINGS IN SAND.
No. 257,345. Patented May 2, 1882.
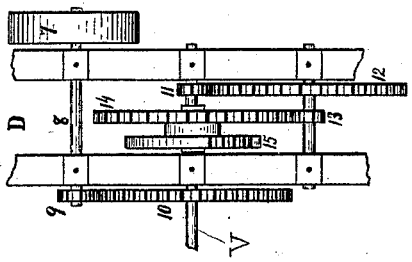
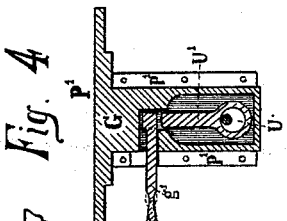
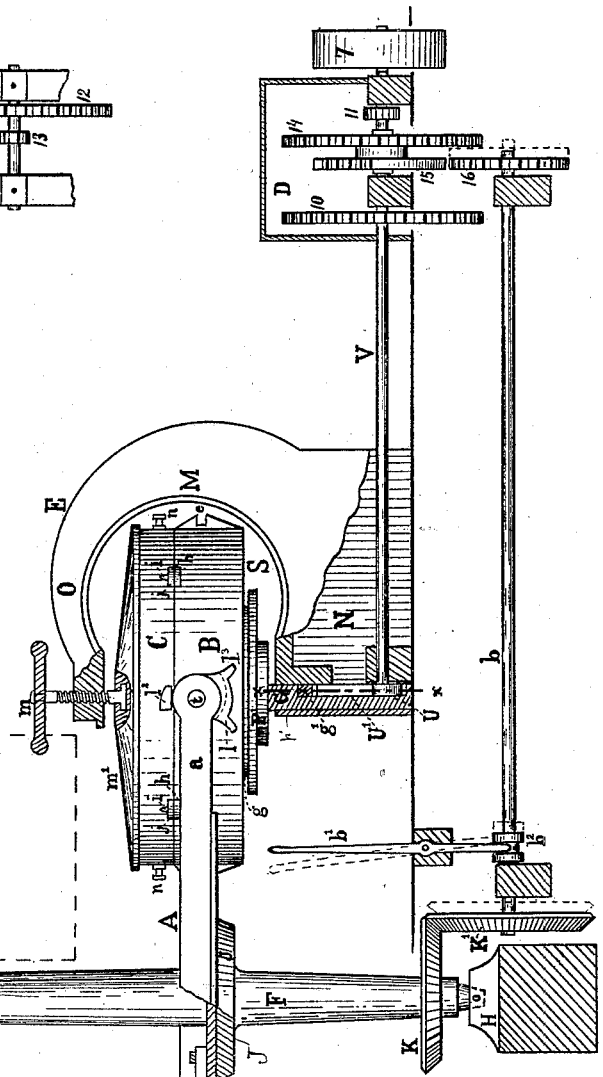
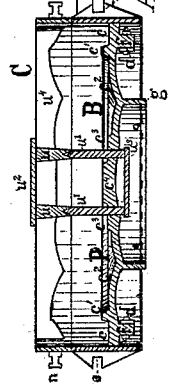
WITNESSES.
Wm Sluyter.
H. B. Hobart.
INVENTOR.
John Lane (No Model.) 3 Sheets—Sheet 2.

J. LANE.
MACHINE FOR MOLDING CAR WHEELS AND OTHER CASTINGS IN SAND.

No. 257,345. Patented May 2, 1882.

WITNESSES.
Wm Sluyter
H. B. Hobart

INVENTOR.
John Lane (No Model.) 3 Sheets—Sheet 3.
J. LANE.
MACHINE FOR MOLDING CAR WHEELS AND OTHER CASTINGS IN SAND.
No. 257,345. Patented May 2, 1882.
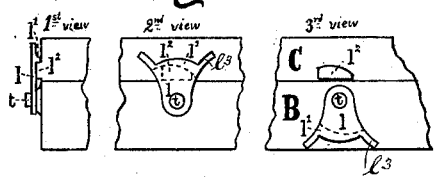
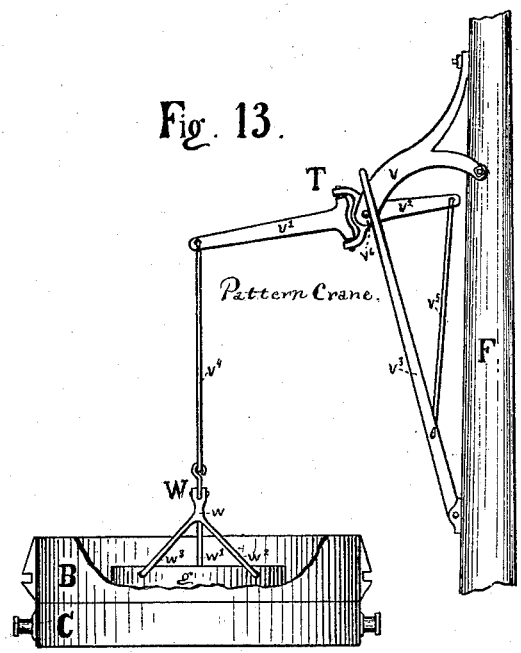
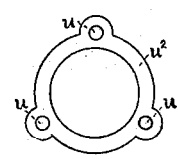
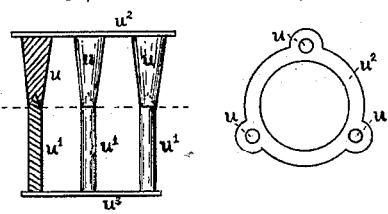
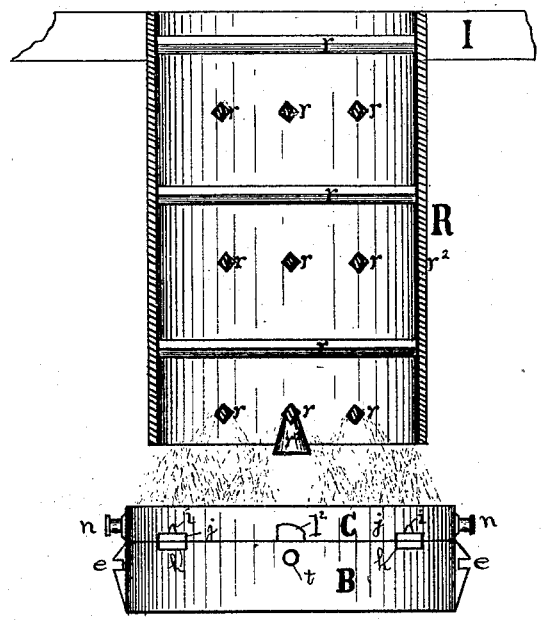
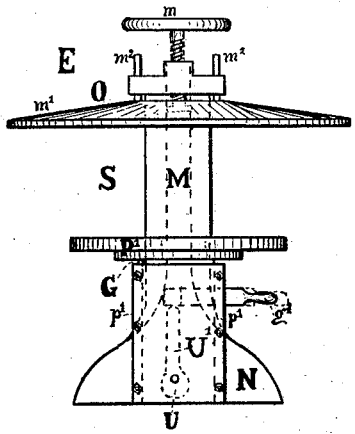
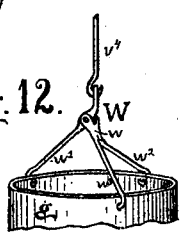
WITNESSES
Wm. Sluyter.
H. B. Hobart.
INVENTOR.
John Lane

UNITED STATES PATENT OFFICE.

JOHN LANE, OF HYDE PARK, ILLINOIS, ASSIGNOR OF ONE-HALF TO N. S. BOUTON, OF SAME PLACE.

MACHINE FOR MOLDING CAR-WHEELS AND OTHER CASTINGS IN SAND.

SPECIFICATION forming part of Letters Patent No. 257,345, dated May 2, 1882.

Application filed February 27, 1882. (No model.)

*To all whom it may concern:*

Be it known that I, JOHN LANE, of Hyde Park, in the county of Cook and State of Illinois, have invented a new and useful Improvement in Machines for Molding Car-Wheels and other Castings in Sand, which improvement is fully set forth in the following specification and accompanying drawings.

This invention is intended for use in making molds in sand for castings in metal, and especially in making molds for car-wheels by compressing the sand and pattern into the half-flask.

The invention consists, first, in a rotating molding-bench carrying the half-flasks horizontally about a center in a circle, during which revolution the half-flask may be filled with sand, the compression made, and the half-flask removed; second, in certain constructions, combinations, and arrangements of parts, as hereinafter fully described and specially claimed, whereby the half-flasks are filled with sand, the pattern moved forward, compressing the sand, the pattern withdrawn, and the mold completed without numerous manipulations by the molder.

Figure 6:
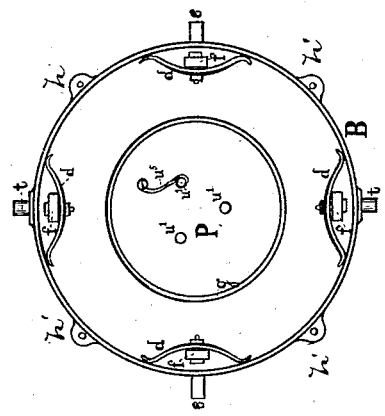
Figure 7:
Figure 5:
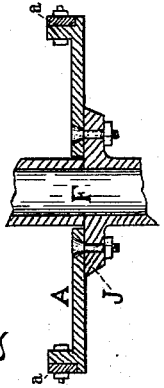
Figure 2:
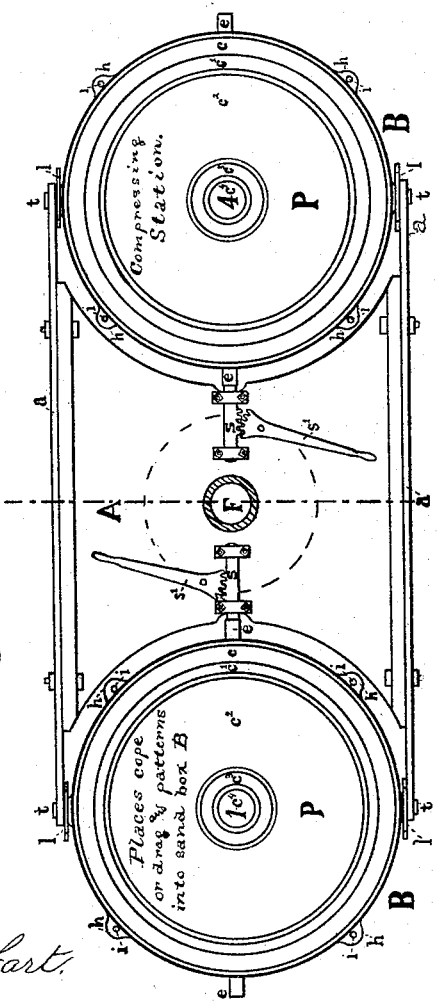

Figure 1 is a side elevation view, showing a part in central section, and showing how the rotating molding-bench A, with sand-box B and half-flask C, the compressor E, and the power-donkey D are arranged relatively to each other, also showing that the power-donkey D communicates motion to both the compressor E and bench A. Fig. 2 is a plan or top view of the bench A, carrying the sand-boxes B B, and showing the pattern P inside the sand-box, also showing the six stations 1, 2, 3, 4, 5, and 6 at which the sand-box may automatically stop and start in its revolving about the center, and showing that the sand-box is trunnioned at $t\,t$ and locked by the slide $s$ engaging with the slotted ear $e$. Fig. 3 is a plan or top view of the power-donkey D. Fig. 4 is a rear view of the head G, taken on the dotted line $x\,x$ in Fig. 1. Fig. 5 is a cross-section view taken on the dotted line $x'\,x'$ in Fig. 2, showing how the arms $a$ may be attached to the bench A, also showing how the bench may be attached to the flange J. Fig. 6 is a view of the sand-box B inverted, showing the under side of the pattern P, and showing the studs $f$ and springs $d$, also showing how the ends of the springs bear against the box B. Fig. 7 is a view of the mold for casting car-wheels as built upon the casting-floor, consisting of two half-flasks with a chill-ring between them. Fig. 8 is three views of the locking-clamp 1. The first view is a cross-section view, the second is a view of the clamp locked, and the third is a view of the clamp unlocked. Fig. 9 is a side view enlarged of a gang of sprue-sticks, one of which is shown in central cross-section; and Fig. 10 is a top view of same, showing how the sprue-sticks may be connected together by a ring, $u^2$. Fig. 11 is a view of the conveyer R, shown in vertical central section, showing the scattering-bars $r$, and showing the position of the conveyer relative to the sand-box and half-flask when the latter are at station 3, Fig. 2. Fig. 12 is a perspective view of the grapple $w$, showing how the grapple takes hold of the extension-flange $g$ when withdrawing the pattern. Fig. 13 is a side view of the crane T, which may be used when withdrawing the pattern. Fig. 14 is a front view of the compressor, showing how the clamping-board $n'$ is suspended from the top of the compressor.

The molding-bench consists of a horizontally-rotating bed, carrying sand-boxes with the pattern about a center and automatically stopping at stations, where work peculiar to the station may be done, and after a time, in which the work may be done, the bench will automatically move on to the next station, and so on the complete circle of stations.

F is a central post, preferably made of cast-iron, and may be made hollow, pivoted, having its bottom end as a pivot, $o$, seated in the stop H, and at its top end a journal-bearing, $o'$, which may be journaled in the timbers I of the floor above.

J is a flange cast solid on the post F, and to which the bed A may be bolted, as shown in Fig. 5. A plan view of the bed A is shown in Fig. 2, which has a hole in its center, through which the post F extends. On each side of the bed A are arms $a$, rigidly attached thereto, and, extending outwardly, support the sand-box B by their trunnions $t\,t$.

B B are the sand-boxes, consisting in this case of cylindrical boxes, open at both ends. On opposite sides of the said sand-boxes are slotted ears e e, and s is a locking-slide engaging in the slotted ear, holding the sand-box rigidly in a horizontal position. A lever, s', is connected with the slide s, by which it may be drawn out of the slotted ear e, when the sand-box may be rotated on its trunnions and the half-flask carried from being on top to being under the sand-box by the inversion of the sand-box carrying the half-flask, and the slide s, engaging the ear e on the opposite side, will hold the sand-box rigidly inverted.

C C are the half-flasks, which may be cylindrical, open at both ends, and have the usual sand-bars, $u^4$, for holding the sand.

Near the bottom end of the post F there is a bevel-gear wheel, K, geared into a like wheel, K', on the end of the shaft b, which shaft b leads to the power-donkey D and has intermittent motion, revolving for about five seconds, when it automatically stops for about twenty-five seconds, as making a stop and start each half-minute. Each movement of the shaft b causes the post F to rotate and move the sand-box from one station to another station—as from station 1 to station 2—and so on round to the several stations, stopping at each station twenty-five seconds, completing a circuit once in each three minutes. Power-donkey D gives and controls the motion of the shaft b and causes the intermittent or automatic motion above described, and will be hereinafter fully explained.

In each sand-box B there is a movable pattern, P, one of which is a pattern for the inside of the wheel, the other for the outside of the wheel. The outer section part, c, of the pattern makes an impression in the sand for the chill, the section part c' an impression for the tread-rim of the wheel, the section $c^2$ an impression for the body, the section $c^3$ an impression for the hub, and the section $c^4$ an impression for the core-print. On the under side of the patterns are springs d, bearing against the sand-box B, as shown in Figs. 1 and 6, which springs hold the pattern in any position as the pattern is moved up or down in the sand-box. The springs d may be bolted to the studs f on the under side of the pattern and have both ends bearing on the sand-box, as shown in Fig. 6; also, on the under side of the pattern there may be an extension-flange, g, for a bearing of the compressor-head when the sand is being compressed; or the studs f may be used in place of such extension-flange by having the compressor-head large enough to reach to and engage with the said studs. The sand-box has ear-lugs h, which are perforated, and in which steady-pins or dowels i may be used to engage with like ear-lugs on the half-flask, as is shown in Fig. 1. The steady-pins i may be screwed rigidly into the lug h and closely, yet loosely, fit in the lug j, and the top end of pin i may be pointed to make it easier in placing the half-flask in position. The pin i may be used reversely by screwing it into the lug on the half-flask, and more or less pins may be used. I prefer to use four pins on each sand-box, as shown in the drawings.

The mold for a car-wheel consists of two half-flasks containing the compressed sand with an impression of the pattern and a chill between them, as shown in Fig. 7, in which C' is the lower half-flask or drag, and C the upper half-flask or cope, and L is the chill. The chill has ear-lugs k, and has dowel-pins entering the lugs j in the two half-flasks above and below, as shown in the drawings. The half-flask has trunnions n n, by which it is swung by a crane-grapple when removing it from the sand-box to the casting-floor, and the chill has like trunnions to facilitate in building up the mold.

The half-flask may be locked to the sand-box by a locking-clamp, l, which is pivoted to the trunnion t, and a catch, l', engaging on the lug $l^2$, made solid on the half-flask, as shown in Fig. 8, the first view showing how the catch l' engages the lug $l^2$. In the second view the clamp is shown locked, and in the third view the clamp is shown unlocked. In operating the clamp l the operator moves the clamp by its handles about the trunnions t, bringing the handles and catch up over the lug $l^2$, snugly seating the catch over the lug. The catch and also the lug may be slightly inclined, as a wedge, so as to draw the half-flask tight to the sand-box, as will be clearly understood by inspecting the drawings in Fig. 8.

In casting car-wheels it has been found best to set the sprue-sticks on the hub part of the pattern and to use three sticks set equidistant about the central core-print. More or less sticks may be used. I prefer to use three connected together by a ring or plate, $u^2$, as shown in Figs. 9 and 10, in which the stick is shown made in two separate parts, the upper part, u, being the sprue-stick proper and the part u' being the extension, the object of such a construction in two parts being that as the loose sand is being compressed and the pattern moved upward the extension u' will be driven down into a perforation in the pattern and the sprue-stick u make a clean perfect gate-hole in the sand when withdrawn upwardly out of the sand, leaving the extension remaining in the pattern.

The sprue-stick u is shown constructed in the usual form, largest at its top end and tapering downwardly, in the bottom end of which I construct a cone-shaped recess, fitting over the pointed cone-shaped top end of the extension u', as shown in Fig. 9. The extension u' is constructed of even size from its bottom end to the taper of its top end, as shown, and is seated snugly, yet movably, in perforations in the pattern, as shown in Figs 1 and 6. A spring may have a bearing against the side of the extension u' to loosely hold the extension, allowing it to be moved in the perforations in the pattern, as shown in Fig. 6, in which $u^5$ is a spring bearing on the extension u'.

In operation the extensions u' are moved up through the pattern, meeting and engaging the bottom end of the sprue-sticks $u$, which sprue-sticks are suspended by a ring, $u^2$, being seated on the top of the sand-bars $u^4$, as shown in Fig. 1, and when the compressor moves the pattern upwardly the extension $u'$ will be driven down into the pattern until the bottom end of the sprue-sticks $u$ meet the pattern, and when the sprue-sticks are withdrawn the extensions will remain in their position, held by the springs $u^5$, until moved up again to meet the sprue-sticks in another half-flask. The tapering cone-shaped top end of the extensions prevents any lodgment of sand between the sprue-stick and extension, by which the gate or hole made by the sprue-stick will be smooth, without a rough edge, and require no after-work.

In operating my invention it is more convenient to move the loose sand from the casting-floor in cars on a tramway to an elevated platform or floor above, where the loose sand may be measured in measures holding the requisite quantity for the half-flask, from which elevation the loose sand may be dumped into a conveyer or spout conducting into the sand-box and half-flask. In molding car-wheels a large quantity of sand is used. Ordinarily some two hundred pounds in the cope and some three hundred pounds in the nowel is used. In the use of my invention a less quantity may be used with equal results. A certain quantity measured must be used in each half-flask. That the compression may be alike in all the flasks of a kind, a smaller half-flask is generally used for the cope. Consequently a less quantity of sand is measured and used for the cope.

When dumping the loose sand from a floor above into a conveyer leading to the sand-box below it is desirable to break the fall and spread the sand as evenly over the pattern as may be, for which I use a conveyer constructed substantially as follows, (shown in Fig. 11,) in which R is the conveyer, consisting of a cylindrical spout or shell, $r^2$, leading from the floor above to near the top of the half-flask, as shown in Fig. 11. Inside the conveyer there are several scattering-bars, $r$, (more or less may be used,) which may be at a right angle to each other, with a sharp corner up, the bars being preferably square-cornered. Loose sand thrown into the top of the conveyer will in falling through fall onto the bars $r$ one after another in succession, breaking the fall, scattering the loose sand, by which the loose sand will fall into the half-flask quite evenly distributed over the large suface of the pattern.

A cone-shaped scatterer, $r'$, may be suspended in the conveyer, as shown in Fig. 11, without which too great a quantity of sand is liable to fall over the high part of the pattern at its center, and more or less of such may be used. The dotted lines between the conveyer and half-flask in Fig. 11 represent the scattered sand falling. A like conveyer may be used for conveying the sifted sand with like good results, and the sifting of the sand may be done in the ordinary way or with a power sifter. (Not shown in the drawings.) The requisite quantity of sand having been properly distributed over the pattern, the sand-box and half-flask will be moved into the mouth of the compressor E, (shown in Figs. 1 and 14,) which may, as in this case, be a modification of the well-known Styles & Parker press, consisting of a body, M, bent with its ends extending, forming a deep mouth, S, as shown. The top end, O, carries a screw, $m$, connecting with the clamping-board $m'$, which is of sufficient size to cover the end of the half-flask, and which is steadied in its place by two guide-posts, $m^2$ $m^2$, as shown in Fig. 14, by which the clamping-board may be moved up and down by the screw, while the guide-posts keep it in a horizontal position. The bottom end, N, carries a movable head, G, having a platform, P', on its top end of sufficient size to engage with the extension-flange $g$, as shown in the drawings. The head G has a movement up and down in the side slides, $p'$, and is caused to have such a movement by the eccentric cam U revolving with the shaft V. The said cam carries a pitman, U', which is moved up and down with every revolution of the shaft, and when the slide $g'$ is in position, as shown in Fig. 4, over the top end of the pitmen the head G will move up and down with every revolution of the shaft; but when the slide $g'$ is withdrawn, as shown in the dotted line, the pitman passes the slide and does not move the head. When in operation the shaft V is in continuous motion and the pitman continually moving up and down, and when the operator moves the slide $g'$ over the top end of the pitman the head will move upward and carry the pattern to the top of the sand-box and compress the sand into the half-flask, and as the pitman returns downwardly the operator draws the slide, so that the pitman may pass without moving the head again until the slide is moved up again.

In withdrawing the pattern from the compressed sand a grapple, W, may be used, as shown in Figs. 12 and 13, consisting of a three-pronged hook, in which two of the prongs, $w^2$ $w^3$, are made solid together and hinged to the prong $w'$ at $w$. The prong $w'$ extends above the said hinge, and has an eye formed in its top end for connecting with the hook on the end of the rod $v^4$, and the bottom ends of all the prongs have their ends bent inwardly as hooks to engage in the perforations in the extension-flange $g$, as shown. The top end of the rod $v^4$ is connected to the outer end of a walking-beam, which is pivoted at $v^6$ to the hanger $v$, which may be attached to the post F or to a beam above, and a rod, $v^5$, is connected with the hand-lever $v^3$, as shown. The walking-beam is made in two parts, hinged or pivoted together, so that the outer part, $v'$, may have lateral play and be swung to one side, so as to pass the conveyer and be out of the way when not being used, as will be understood by inspecting the drawings. In operation, the grapple having been placed with its hooks engaging hold of the extension-flange $g$, the operator will then take hold of the top end of the lever $v^3$ and pull the lever down, which will draw the pattern upward out of the compressed sand, when the grapple may be unhooked and the walking-beam swung around out of the way. A like grapple, but smaller, may be used in place of the grapple $w$ when drawing the sprue-sticks.

When removing the completed half-flask of compressed sand from the sand-box the ordinary lifting or carrying crane commonly used in handling flasks may be used, and such being well known need not be here described.

The revolving of the molding-bench A may be stopped by the lever $b'$ moving the shaft $b$ and wheel $k$ out of gear, as shown in dotted lines in Fig. 1, which lever has its bottom end engaged in a groove in the hub $b^2$, which is attached to the shaft, as shown.

The power-donkey D consists of a series of cogged wheels, with pinions and shafts, arranged in a suitable frame, communicating motion from the pulley 7 to the compressor E and molding-bench A, as shown in Figs. 1 and 3. Pulley 7 is arranged on the shaft 8, which shaft has attached thereto the pinion 9, which is geared into the cogged wheel 10, attached to the shaft V, causing the shaft V to revolve, preferably eighteen times each minute, whereby the head G of the compressor may be moved up and down once in the one-eighteenth part of a minute. The shaft V has attached thereto the pinion 11, which is geared into the cogged wheel 12, decreasing the motion to three revolutions each minute. On the same shaft with the wheel 12 is the pinion 13, which is geared into the idle cogged wheel 14, causing the said idle-wheel to revolve once in each half-minute. The said idle-wheel is made solid together or rigidly connected with the partially-cogged wheel 15, and both wheels 14 and 15 rotate on (not with) the shaft V.

Directly or nearly perpendicular under the shaft V is situated the shaft $b$, which shaft $b$ has attached thereto the cogged wheel 16, which is geared into the partially-cogged wheel 15. The wheel 15 has cogs for one-sixth (less the number of cogs engaged at one time) of the distance around its rim, and is bare (without cogs) for the remaining five-sixths distance, whereby the wheel 15, with its cogged portion, will engage with the wheel 16 and cause it to rotate one-sixth of a revolution, and then the bare portion of the wheel 15 will pass on and allow the wheel 16 to stop while the wheel 15 is making a five-sixth part of a revolution, and wheel 15, having a motion of one revolution in each half-minute, will cause the wheel 16 to start and stop once in each half-minute and to remain stopped for five-sixths of each half-minute of time. The wheels 15 and 16 are of like diameter, and also the bevel-wheels K K' are of like equal diameter. Consequently the same intermittent or automatic motion given to the wheel 16 is transmitted through the shaft $b$, bevel-wheels K K', post F, to the molding-bench A, whereby the sand-box, with the half-flask, is rotated about a center with automatic stops and starts, as shown. A faster or slower motion than stated may be used, as desired.

In operating my invention two operators may work, one at each end of the molding-bench, each following a half-flask about the circle; another man takes the finished half-flask away to the casting-floor, and another man attends to the sand, measuring and dumping the sand into the conveyer at the proper time. The operation commences at station 1 with the pattern in position in the sand-box, as shown in Fig. 1, the operator first shaking a dust-bag over the pattern, then placing in position the half-flask on the top of the sand-box, as shown in the drawings. Then the sand-box will move to station 2, where a shower of sifted sand is let fall into the sand-box, which the operator may hand-tuck about the pattern, and the operator will set the sprue-sticks when molding the upper half-flask. Then the move is made to station 3, where the required quantity of sand is dropped through the conveyer into the sand-box and half-flask, and the operator may distribute the sand to even the work. Then a move is made to station 4, into the mouth of the compressor, where the operator first turns the screw $m$, running the clamping-board $m'$ down to the top of the half-flask, then moves in the slide $g'$, by which the compressor-head G will move upward and drive the pattern to the top of the sand-box, compressing all the sand into the half-flask about the pattern. The pattern will remain at the top of the sand-box by the action of the springs $d$ bearing on the sand-box B and the head G return to its position below the sand-box. The operator will draw out the slide $g'$ and return the screw $m$ to its original position, after which a move is made to station 5, where the operator first runs the clamp $l$, locking, to lock the half-flask to the sand-box. Then the slide $s$ is drawn and the sand-box and half-flask inverted, carrying the half-flask underneath the sand-box, after which the operator draws the pattern to its original position, then reinverts the sand-box, bringing the half-flask to the top again, and then unlocks the clamp $l$. Then the move is made to station 6, where the operator first draws the sprue-sticks, after which a carrying-crane takes the half-flask away to the casting-floor, and the move is made to the station 1 preparatory for another trip about the circle.

It will be observed that the compressing of the sand is done by the compressor E driving the pattern upward, compacting all the sand into the half-flask above the pattern, and that then the compressor leaves the pattern so compressed in the sand; that then the sand-box and half-flask move on to station 5, where they are inverted and the half-flask carried under the sand-box, and that then the pattern is withdrawn upward out of the sand to its original position; that the pattern is withdrawn by an appliance working separate from the compressor.

I have shown the work as being done at the several stations when the molding-bench was at rest. Some of the work may be done during the time the move is being automatically made from station to station, as locking and unlocking the clamp $l$, setting the sprue-sticks, dusting the pattern, &c., and also when by having a slower movement in rotating the molding-bench, then the stopping and starting may be done by the lever $b'$ moving the wheel $K'$ out of gear. All the work save the compressing of the sand may be done while the molding-bench is moving and without stopping at the several stations, and still retain elements of my invention.

Having thus described and set forth my invention, what I claim, and desire to secure by Letters Patent, is—

1. In a machine for molding car-wheels and other castings in sand, a horizontally-rotating molding-bench carrying the sand-box B, containing a movable pattern, and a half-flask, C, seated on the top end of the said sand-box, substantially as and for the purpose set forth.

2. A horizontally-revoluble molding-bench carrying a sand-box containing a movable pattern, with a half-flask, in combination with a compressor operating to move the pattern and compress the sand, substantially as and for the purpose set forth.

3. In a machine for molding in sand, a horizontally-rotating molding-bench carrying about a center the sand-box, the pattern, and half-flask, substantially as shown, in combination with a sand-conveyer for distributing the loose sand over the pattern when the pattern and half-flask are under the conveyer, and with a compressor moving the pattern and compressing the sand out of the sand-box into the half-flask, arranged and operating substantially as shown, and for the purpose set forth.

4. In a machine for molding in sand, a horizontally-rotating molding-bench, A, constructed with arms $a$ to support the sand-box, the sand-box being trunnioned in the outer ends of the said arms, with a locking-slide to engage with the sand-box and hold it in a horizontal position, as specified.

5. The combination, in a machine for molding in sand, of a horizontally-revoluble molding-bench, A, flange J, and post F, arranged as shown, with the arms $a$, sand-box B, having pivots in the arms $a$, and the half-flask C, arranged and operating substantially as shown, and for the purpose set forth.

6. In a machine for molding in sand, the horizontally-revoluble molding-bench, the sand-box, the pattern, and half-flask, revoluble about a center, all constructed and arranged as shown and described, in combination with suitable mechanism to automatically move the molding-bench step by step, in the manner described, and for the purpose set forth.

7. In a machine for molding in sand, the horizontally-revoluble molding-bench, the sand-box, the pattern, and half-flask, revoluble about a center, all constructed and arranged as shown and described, in combination with suitable mechanism to automatically move the molding-bench step by step, and with mechanism, such as shown and described, for dumping the required quantity of sand into the sand-box, for compressing the sand into the half-flask, for withdrawing the pattern, and for removing the half-flask, substantially as shown, and for the purpose set forth.

8. In a machine for molding in sand, which consists of the combination of a horizontally-revoluble molding-bench, sand-box with pattern, and a half-flask, means for revolving the same about a center, a compressor having a movable head, G, cam U, pitman U', and a slide, $g'$, arranged and operating substantially as shown, and suitable mechanism for stopping the revolving of the molding-bench, by which the sand-box and half-flask will be at rest while the compressor-head G is moving the pattern, substantially as shown, and for the purpose set forth.

9. In a machine for molding in sand, the sand-box B, constructed with open ends and with trunnions $t$, slotted ears $e$, and ear-lugs $h$, with dowels $i$, in combination with a half-flask, C, and with a horizontally-rotating molding-bench having arms $a$, and with a locking-slide to engage with the sand-box and hold it in a horizontal position, substantially as shown, and for the purpose set forth.

10. The combination, in a machine for molding in sand, of the sand-box B, and the pattern P, with the spring $d$, arranged and operating substantially as shown, and for the purpose set forth.

11. The combination, in a machine for molding in sand, of a locking-clamp, $l$, constructed with a catch, $l'$, and handles $l^3$, as shown, the said clamp pivoted to the trunnion $t$, and the catch $l'$ being arranged to engage with the lug $l^2$, locking the half-flask to the sand-box, substantially as specified.

12. The combination, in a machine for molding in sand, of the sprue-stick $u$, constructed, substantially as shown, with a cone-shaped recess in its bottom end, and with the extension $u'$, constructed with a pointed cone-shaped top end fitting the bottom end of the sprue-stick, as shown, the extension $u'$ being movably seated in perforations in the pattern, substantially as shown, and for the purpose set forth.

13. The combination, in a machine for molding in sand, of the sprue-stick $u$ and the extension $u'$ with the spring $u^5$, the latter bearing on the extension $u'$, as shown, and for the purpose shown.

14. The combination, with a machine for molding in sand, of the conveyer R, constructed, substantially as shown, with a series of scattering-bars, *r*, arranged in succession, whereby loose sand, in passing through the conveyer, will be scattered and distributed over the surface of the pattern, substantially as specified.

15. The combination, in a machine for molding in sand, of the conveyer R, with a series of scattering-bars, *r*, arranged in succession, and with a cone-shaped scatterer, *r'*, arranged and operating substantially as shown, and for the purpose set forth.

16. In a machine for molding in sand, a horizontally-rotating molding-bench, sand-box with pattern, and a half-flask, revolving about a center, in combination with a compressor and crane T, with grapple W, arranged in succession, whereby the loose sand will be compressed by the compressor, after which a move is made from the compressor and then the pattern withdrawn from the compressed sand by the crane and grapple, all arranged and operating substantially as shown, and for the purpose set forth.

17. The combination, with a machine for molding in sand, of the power-donkey D, consisting of a series of cogged wheels with pinions, and one wheel bare of cogs for the greater portion of its rim, as shown, arranged and operating with the compressor E and rotating molding-bench A, substantially as shown, and for the purpose set forth.

18. In a machine for molding in sand, a horizontally-revoluble molding-bench, constructed with arms *a*, and a sand-box trunnioned in the said arms at each end of the said molding-bench, in combination with suitable mechanism to move the molding-bench, carrying the sand-boxes about a center, in the manner described, and for the purpose set forth.

JOHN LANE.

Witnesses:
H. B. HOBART,
WM. SLUYTER.